United States Patent [19]

Schegerin

[11] Patent Number: 5,396,935

[45] Date of Patent: Mar. 14, 1995

[54] PROCESS TO OBTAIN AN HOMOGENEOUS MIXTURE OF LIQUID OXYGEN AND LIQUID NITROGEN

[76] Inventor: Robert Schegerin, 4, Chemin Du Vallot, 78350 Jouy-En-Josas, France

[21] Appl. No.: 127,578

[22] Filed: Sep. 28, 1993

[30] Foreign Application Priority Data

Oct. 2, 1992 [FR] France .................. 92 11658

[51] Int. Cl.⁶ .............................................. B65B 3/00
[52] U.S. Cl. .................................... 141/9; 141/3; 141/5; 141/104; 141/83; 62/50.1
[58] Field of Search ............................ 141/2–5, 141/7, 9, 18, 21, 83, 100, 104, 105; 62/46.1, 49.1, 50.1

[56] References Cited

U.S. PATENT DOCUMENTS

| | | | |
|---|---|---|---|
| 4,181,126 | 1/1980 | Hendry | 128/201.21 |
| 4,351,372 | 9/1982 | Delgado, Jr. | 141/2 |
| 4,513,796 | 4/1985 | Miller et al. | 141/83 |
| 4,640,323 | 2/1987 | Norcia et al. | 141/18 |
| 4,860,803 | 8/1989 | Wells | 141/9 |
| 4,883,099 | 11/1989 | Vanommeren | 141/9 X |
| 5,022,442 | 6/1991 | Bird | 141/100 |

FOREIGN PATENT DOCUMENTS 2554230  5/1985  France .
2561385  9/1985  France .
58-76260 5/1983  Japan .

*Primary Examiner*—J. Casimer Jacyna
*Attorney, Agent, or Firm*—Larson and Taylor

[57] ABSTRACT

A small container is filled with a mixture of oxygen and nitrogen in a predetermined and precise concentration from a source of liquid oxygen and liquid nitrogen automatically, safely, and without the possibility of a human error. The empty weight is verified. Liquid oxygen is directed to vessel. When the mass of liquid oxygen is stabilized at a preset value, liquid flow is stopped. A second pipe is cooled using liquid nitrogen, by emptying through this pipe to the atmosphere liquid nitrogen. The vessel is filled with liquid nitrogen, until the vessel is full. The correct proportion of oxygen/nitrogen is controlled.

3 Claims, 1 Drawing Sheet

PROCESS TO OBTAIN AN HOMOGENEOUS MIXTURE OF LIQUID OXYGEN AND LIQUID NITROGEN

BACKGROUND OF THE INVENTION AND PRIOR ART

There are numerous cases where it is necessary to have a small vessel containing an homogeneous mixture of liquid oxygen and liquid nitrogen in a predetermined and precise proportion.

For example a liquid oxygen/nitrogen homogeneous mixture can be used for many life support appliances where it is important to provide to the worker a pure gas for him to breathe. In addition the liquid mixture can provide to the worker a non negligeable cooling power. Current manufacturing processes of liquid gas produce liquid oxygen on one hand and liquid nitrogen On the other hand. It looks easy at first to obtain the desired mixture by mixing the two components. But in fact it is very difficult since the association of the two liquids (oxygen and nitrogen) is not a simple mixture but more like a dissolution of one liquid into the other. This dissolution is not stable since the liquid nitrogen is more volatile than the liquid oxygen. This phenomenon leads to a rapid increase of the concentration of oxygen in the liquid mixture and a rapid increase of nitrogen in the gaseous mixture existing above the surface of the liquid mixture. Several solutions have been tested to obtain in a large container a large quantity of liquid air in order to fill from this large tank, smaller containers ready to be used. These types of solutions lead to a large waste of oxygen and nitrogen since it is necessary to empty and throw away regularly a large quantity of precious oxygen and nitrogen; in these cases it is necessary to waste and empty out regularly a large quantity of liquid since progressively the liquid gets richer and richer in oxygen and this liquid mixture is too rich in the oxygen and the entire liquid still available has to be dumped out and replaced by a new mixture having a correct proportion of oxygen. Typically large tanks have a capacity of 1 to 10 cubic meters. Variation of the oxygen concentration is about 2 percent every day. For example if you have to fill 2 small 10 liter containers every day with a mixture of $24\pm 1$ percent of oxygen ($76\pm 1$ percent of nitrogen) from a 10 cubic meter tank, it is necssary to waste 9,980 liters of precious liquid every day in order to fill two 10 liters small containers. This phenonon makes the use of liquid air for small life support systems uneconomical and unaccessible to most potential users. Up to now the use of a large tank was mandatory in order to obtain a homogenous mixture containing a predetermined and precise concentration of oxygen.

Furthermore the transfer from the large tank to the small container is very difficult since the nitrogen has a tendency to become gas before the oxygen and to stay or directly go in the upperparts of the ducts and containers, modifying the concentration of liquid and gaseous mixture. This is an unacceptable threat to the safety of the men having to use this life support equipment since the concentration of the liquid air delivered may not be within the acceptable limits.

SUMMARY OF THE INVENTION

One object of the invention is to provide a process and an installation capable of filling up a small container with a mixture of oxygen and nitrogen in a predeterminated and precise concentration from a source of liquid oxygen and from an other source of liquid nitrogen automatically, safely and without the possibility of a human error.

It is important to realize that the mass of oxygen or nitrogen contained in a small vessel, at a given pressure, is very small (a few grammes) when this element (oxygen or nitrogen) is under a gaseous form, but is very heavy (several kilogrammes) when this element is liquid. By placing the exhaust valve at the top of the container, the element (oxygen or nitrogen) escaping from the vessel will always be in a gaseous form. It is also important to realize that for a given pressure the boiling temperature of the liquid nitrogen is less than the boiling temperature of the liquid oxygen. Therefore the admission of liquid nitrogen (even with some bubbles of nitrogen) into a vessel containing liquid oxygen does not have a tendency to make the oxygen boil and therefore escape through the exhaust valve. The invention proposes a process making possible and feasable the filling of a vessel with a homogeneous liquid mixture of liquid oxygen and liquid nitrogen in a predeterminated and precise concentration of oxygen from a source of liquid oxygen and an other source of liquid nitrogen automatically, safely and without the possibility of a human error.

This process is composed by the following steps. These steps have to be executing in the following order:
1) verification of the empty weight,
2) start filling the vessel with liquid oxygen using first pipe,
3) stop filling the vessel with liquid oxygen when the mass of liquid oxygen is stabilized at the precise value, regardless of the quantity of liquid oxygen really delivered to the vessel,
4) start cooling the second pipe using liquid nitrogen, by emptying through this pipe to the atmosphere liquid nitrogen,
5) stop cooling this said second pipe when this pipe is cold enough or after a set time,
6) start filling the vessel with liquid nitrogen,
7) stop filling the vessel with liquid nitrogen when the vessel is full,
8) control that the proportion oxygen/nitrogen is correct by verifying that the total weight of the vessel is in accordance with what it should be, taken into account:
   the empty weight expressed in kg of the vessel (EW)
   the volume of expressed in liters the vessel (V)
   the density of the liquid oxygen (DO)
   the density of the liquid nitrogen (DN)
   the predeterminated concentration expressed in percentage of oxygen(CO)
and pursuant to the following formula:

$$\text{Total weight} = EW + V/100 \\ (CO \times DO + (100 - CO) \times DN)$$

It is to be noted that the control of the percentage content of oxygen can be made with a high level of confidence and precision since it can be seen that all parameters in the previous equation can be known with great precision (higher than one per thousand). Therefore we can estimate the control of the concentration of the liquid mixture at value better than one fraction of one percent (which is impossible to obtain with other methods).

$$CO = 100 \{TW - EW - V \cdot DN\}/\{V(DO - DN)\}$$

The concentration of oxygen in the liquid portion and in the gaseous portion of the vessel can be different but this does not have any consequences providing that only the liquid portion of the mixture is used to breathe.

The circulation of the liquid mixture in the ducts through the system can be generated by the pressure of the gaseous portion existing in the vessel. This pressure can be stabilized by one or more calibrated exhaust valves. The invention also proposes an installation using the process described above, comprising:

- at least one electronic scale holding the vessel to be filled,
- means to display and/or an interface giving a usable signal function of the vessel weight,
- a first pipe comprising one electrically controlled one valve and a safety valve connecting the bottom of the liquid oxygen container to the bottom of the vessel to be filled,
- a second pipe comprising at least one electrically actuated valve and a safely valve connecting the bottom of the liquid nitrogen tank to the bottom of the vessel to be filled,
- and a third electrically actuated valve enabling the exhaust of nitrogen from the nitrogen tank to the atmosphere,
- and means to operate in sequence all these said actuated valves.

Flow limiters, such as pipe restrictors are placed in the circuit to limit excessive flow due to valve failure or rapid increase of pressure in the tanks.

The invention will be better understood by reading the following description of one particular application of the invention given here as an example.

BRIEF DESCRIPTION OF THE DRAWINGS

These and other objects and advantages of the invention will be apparent upon reading the following description in conjunction with the drawings.

DESCRIPTION OF THE PREFERRED EMBODIMENT

Figure 1:
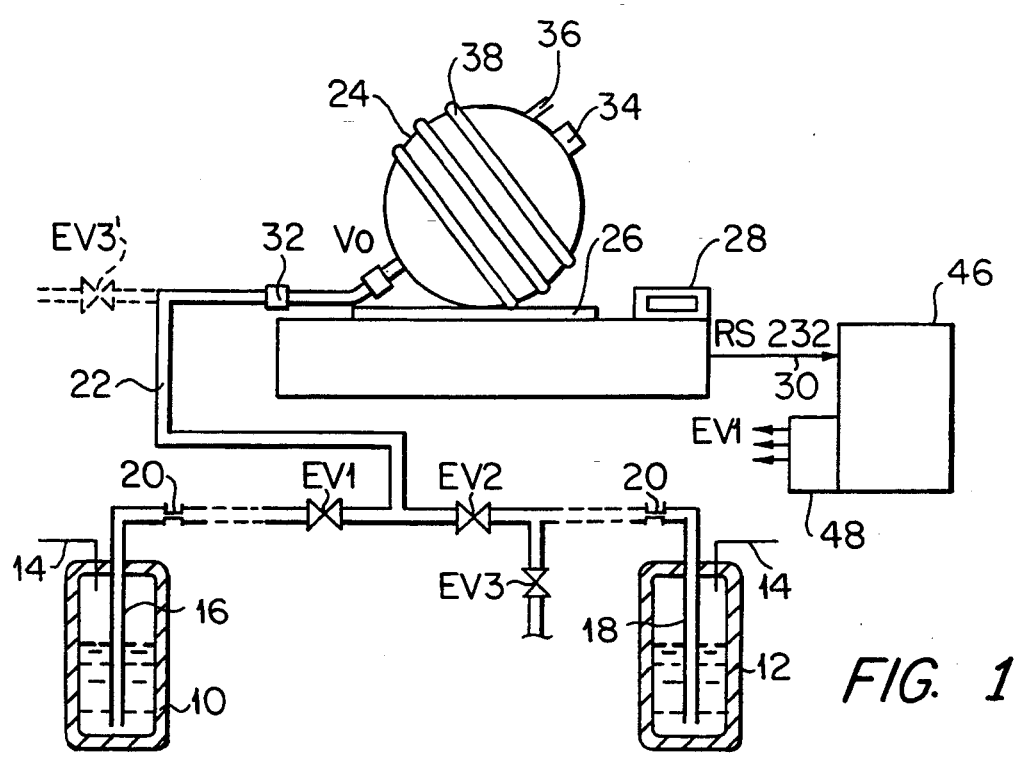
FIG. 1 is a schematic of a possible installation.

The installation principle presented in FIG. 1 is composed of Dewar vessels 10 an 12 containing respectively a quantity of liquid oxygen and liquid nitrogen. The pressure existing inside these vessels is adjustable by using a pressurized source of inert gas through duct 14 or simply by using regulating valves. Pipes 16 and 18 carry the liquid located at the bottom of the dewars vessel through-calibrated restrictors 20 to the rest of the system through the valves EV1 and EV2 which are normally closed. These two pipes are merging into one pipe 22 having a connection VO with the vessel 24 to be filled. The vessel 24 to be filled is placed on a weight sensitive means 26 equipped with an indication display 28 and with an electronic interface giving a signal 30, representative of the weight of the vessel, for example in a form of an asynchronous signal pursuant to the norm RS 232.

A flexible part 32 will be provided to give a great flexibility to pipe 22 in order to measure without interference the total weight of the vessel to be filled.

The vessel is for example fitted with a safety valve 34 and a port 36 that can be connected with the bottom of the vessel using a small pipe 38 located outside the vessel.

The installation is fitted with an activated valve EV3, normally closed, letting the nitrogen escape to the atmosphere and cooling on the way the pipe 18. But the dumping of nitrogen could be placed at another place for example as shown in dashed line on FIG. 1.

Figure 2:
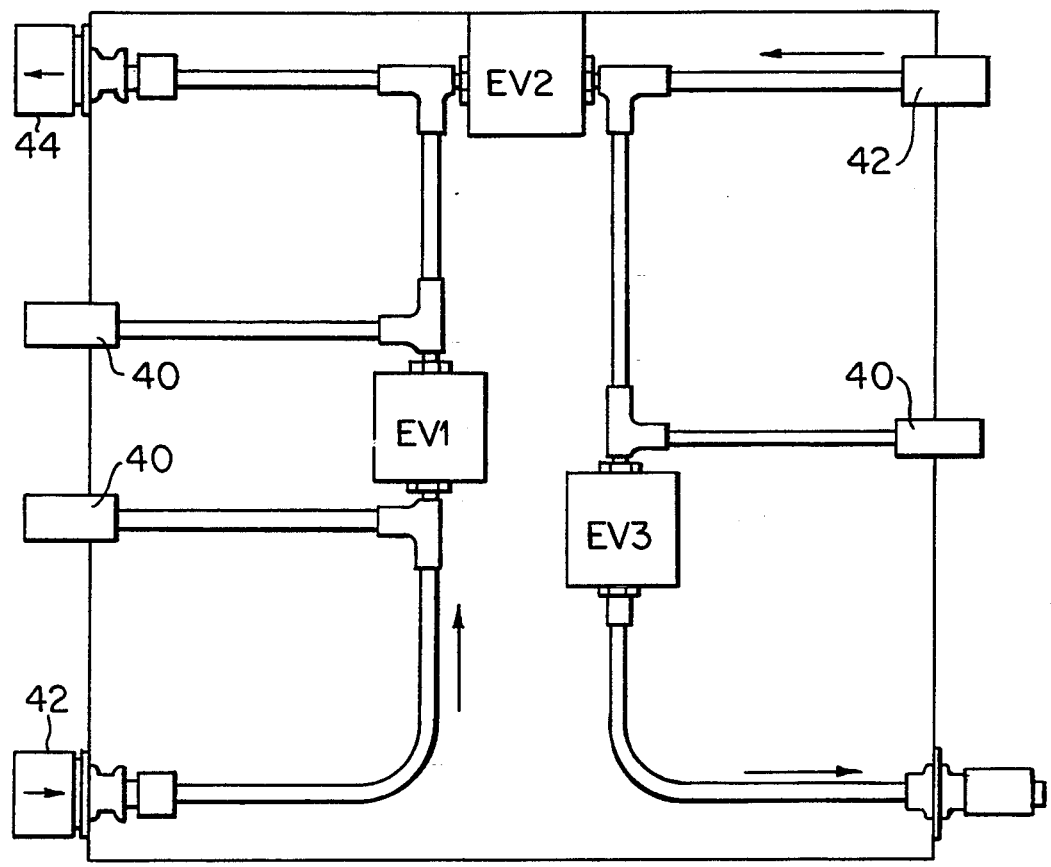
FIG. 2 is a possible disposition of the valves and devices placed on a cart equiped with the weight sensitive device supporting the container to be filled.

FIG. 2 shows a possible arrangement of the controled valves EV1 and EV3 and a possible disposition of the safety valves 40 and pressure limiters. All these components can be placed on a plate offering an easy access for maintenance purposes, other components can be placed on this plate or the cart such as the connectors 42 connecting the liquid oxygen and liquid nitrogen tanks and a connector 44 to interface with the flexible pipe 22.

All pipes are thermally insulated in order to minimize the increase of temperature of the liquid gas. The connectors and valve should also be thermally insulated.

The installation shown on FIG. 1 can be easily automated without any difficulties by adding a programmable machine or a micro-controller or a computer 46 connected to the weight sensitive means and a time sensitive means. The micro-controller can be fitted with a relay box or an electronical amplifier circuit box 48 to control the valves.

The micro-controller or the computer can be programmed to automatically execute the following actions in the following order:

At the beginning all electrically controled valves are closed, valve VO is open. In response to a signal, a test is performed to check that the vessel is empty. This check is performed by comparing the measured weight of the vessel with a predetermined value. If there is a significant difference the operation is stopped and an alarm signal is activated; if there is no significant difference then the filling operation can proceed.

The micro-controller (or computer) 46 sends to relay box 48 the order to open the electrically controled valve EV1. The progressive filling up of the vessel in liquid oxygen is followed up in real time by the micro-controller by reading in real time the signal and the evolution of the signal given by the weight sensitive means. Once the preset value M1 is reached, the micro-controller sends an order to close the electrically controlled valve EV1. It is to be noted that the valves are placed in order to minimize the quantity of liquid gas trapped in the pipes, so that this quantity is relatively small. It is to be noted that this operation has transferred more liquid oxygen into the vessel than needed but also has cooled the pipes and the vessel itself. This cooling power came from the phase change of the liquid oxygen that became gas and has been evacuated to the atmosphere through the exhaust valve placed at the top of the vessel. The remaining liquid oxygen in the vessel is exactly the quantity needed. The next step is to cool the nitrogen pipes in order to be sure that no relatively warm gas will enter into the vessel and make the liquid oxygen boil, evaporate, and be dumped in the atmosphere. In order to do that the nitrogen pipes are cooled using a nitrogen flow dumped in the atmosphere through an electrically controlled valve EV3 placed closely and just before the valve EV2 and EV1. So the micro-controller 46 sends an order to open valve EV3. A small quantity of liquid nitrogen defined by the restrictor 20, flows in the pipes and is dumped in the atmosphere cooling the pipes on the way. This operation can be performed for a given preset time or be controlled by the indications of one or several thermal sensors.

Once the nitrogen pipes are cold enough, the micro-controller 46 sends to the relay box 48 the order to close the electrically controlled valve EV3, then to open the valve EV2 to bring the mass of the vessel to a preset value equal to M1+M2. The electrically controlled valve EV2 is then closed and an audio or visual signal is activitated to indicate to the operator that the filling process has ended, and it is possible to disconnect the vessel from the installation after having closed the valve VO.

It is to be noted that this mass M1+M2 can be defined as a mass corresponding to or slightly greater than the total and correct filling of the vessel. In this case the operator will be able to verify that some liquid gas is coming out of vessel through the exhaust valve just when the audio or visual signal (stating the end of the operation) is activated. If that is the case, it proves that the concentration is correct and that the entire filling process went perfectly since the concentration CO is a function of:

the total weight of the filled vessel
the empty weight of the vessel (EW)
the volume of the vessel (V)
the density of the liquid oxygen (DO)
the density of the liquid nitrogen (DN)

Such as: $CO = 100 \, (TW - EW - V.DN)/(V(DO - DN))$ and since all these values are well known with a great precision. Such an installation can he used to fill a portable cryogenic container. The weight sensitive means can consist of an electronic scale capable of measuring up to 50 kilogrammes with a precision equal to or better than 10 grammes. The micro-controller can be a motorola 68-HC II A8 and can operate the electrically controled valves using classical power relays or elecronic amplifiers.

The valves will be able to function correctly at low (−200° C.) and high (+100° C.) temperature. The pipes will have an internal diameter big enough so that the filling operation will not last too long (at least about 8 millimeters).

I claim:

1. A process for filling a small Dewar vessel with a predetermined and precise homogenous mixture of liquid oxygen and liquid nitrogen from a liquid oxygen tank and a liquid nitrogen tank comprising the following steps:
   a) verify that the vessel is empty,
   b) start filling the vessel with liquid oxygen using a first pipe,
   c) stop filling the vessel with liquid oxygen when the mass of liquid oxygen is stabilized at a preset value M1 regardless of the liquid oxygen quantity really delivered to the vessel,
   d) start cooling a second pipe using liquid nitrogen, by emptying through said second pipe to the atmosphere liquid nitrogen,
   e) stop cooling said second pipe when said second pipe is cold enough,
   f) start filling the vessel with liquid nitrogen using said second pipe,
   g) stop filling the vessel with liquid nitrogen when the vessel is full,
   h) check that the proportion oxygen/nitrogen is correct by verifying that the total weight of the vessel is in accordance with a preset value, taking into account:
      the empty weight expressed in kg of the vessel (EW)
      the volume of expressed in liters the vessel (V)
      the density of the liquid oxygen (DO)
      the density of the liquid nitrogen (DN)
      the predetermined concentration expressed in percentage of oxygen (CO) and pursuant to the following formula:

total weight $= EW + V/100(CO \times DO + (100 - CO)DN)$.

2. The filling process of claim 1 wherein it is known that the vessel is full when the exhaust valve placed on the vessel starts to let the mixture in liquid form escape to the atmosphere.

3. The filling process of claim 2 wherein the liquid gas circulation in the pipes is realized by pressure differences created by the pressure existing in the gaseous phase of the containers.

* * * * *